United States Patent [19]

Mátyás et al.

[11] Patent Number: 4,649,031

[45] Date of Patent: Mar. 10, 1987

[54] PROCESS FOR RECOVERING RARE METALS FROM THE COMBUSTION RESIDUE OF COAL BY DIGESTION

[75] Inventors: Béla Mátyás; Pál Gerber; András Solymos; Ferenc Kaszanitzky, all of Tatabánya; Gyorgy Panto; Janos Leffler, both of Budapest, all of Hungary

[73] Assignee: Tatabányai Szénbányák, Tatabanya, Hungary

[21] Appl. No.: 319,189

[22] Filed: Nov. 9, 1981

[30] Foreign Application Priority Data

Nov. 14, 1980 [HU] Hungary ............................. 2723/80

[51] Int. Cl.$^4$ .................. C22B 60/02; B01F 1/00; C01G 43/00; C01F 1/00
[52] U.S. Cl. ........................................ 423/20; 423/11; 423/18; 423/3; 423/21.1; 423/53; 423/62; 423/68; 423/131; 423/132
[58] Field of Search ............... 423/21.1, 53, 62, 68, 423/131, 132, 17, 18, 20, 3

[56] References Cited

U.S. PATENT DOCUMENTS 1,399,246 12/1921 Bleecker .............................. 423/68
1,964,382  6/1934 Fleischer ............................. 423/132
4,113,313  9/1978 Terry .................................... 423/17
4,252,777  2/1981 McDowell et al. ................. 423/10

OTHER PUBLICATIONS

Jack et al., "Leaching of Vanadium and Other Metals from Athubasca Oil Sands Coke and Coke Ash", Fuel, V58, pp. 589-593, 1979.

Primary Examiner—Andrew H. Metz
Assistant Examiner—Chung K. Pak
Attorney, Agent, or Firm—Ganriel P. Katona

[57] ABSTRACT

The invention relates to a method for recovering rare metals from the combustion residues of various coals, in particular brown coals. The recovery is performed by digestion, more particularly by aqueous and/or dilute alkaline and/or dilute acidic digestion, where two or three of these steps can be combined in any desired order or they may be carried out separately. During digestion the concentration of the solution is monitored and the subsequent digestion steps are terminated at a desired concentration. The solid and liquid phase are then separated and the rare metals are isolated from the liquid phase while the solid phase, optionally after neutralization and/or washing can be utilized for example as a source of energy.

8 Claims, 1 Drawing Figure

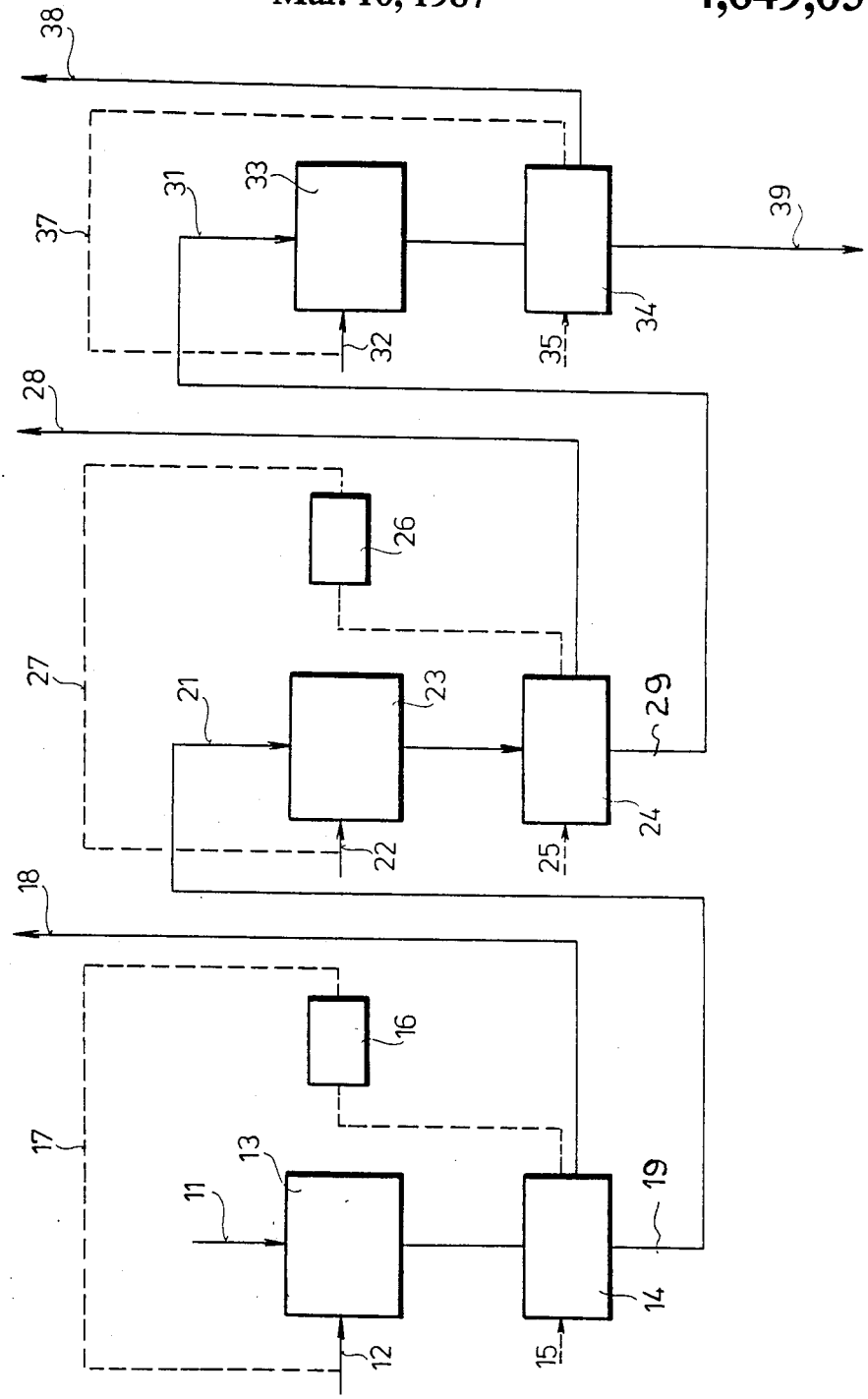

PROCESS FOR RECOVERING RARE METALS FROM THE COMBUSTION RESIDUE OF COAL BY DIGESTION

BACKGROUND

The invention relates to a process for recovering rare metals from the combustion residues of various coals, in particular brown coals. The term "combustion residue" as used throughout the specification includes fly ash, ash, slag and the like.

For a long time coal was almost exclusively utilized as a source of energy. Later it was discovered that coal contains numerous valuable materials, particularly metals of columns Vb and VIb of the periodic system of elements as well as various lanthanides and actinides. Hereinafter these metals will be referred to as "rare metals".

These rare metals are enriched in the combustion residue of coal to a concentration which is more than 200 to 500-times higher than their average concentration in the earth's crust. For example the combustion residue of brown coal from the Eocene epoch in Hungary contains more than 2000 to 3000 ppm of vanadium, 2000 to 5000 ppm of chromium, 100 to 200 ppm of molybdenum, more than 2000 ppm of lantanides and more than 1200 ppm of actinides.

There are processes known in the art for the isolation of rare metals from coals, they are, however, extremely expensive. In certain cases the treatment has an influence on the use of the coal as a source of energy. In other cases the combustion residues need to treated with various further additives to isolate the rare metal, and accordingly, the energy demand of the whole process is considerably increased.

A process is disclosed in Soviet Pat. No. 256,261 for recovering vanadium. According to this patent the coal is admixed with calcium oxide or calcium carbonate prior to combustion, or these additives are added to the ash. The mixture of ash and the additive is then heated to a temperature of 850° C. and then it is treated with a 3% aqueous sodium carbonate solution, at a temperature of 98° C. As a result of this treatment vanadium is dissolved in the form of $NaVO_3$. The residue is then treated with a 5% aqueous sulfuric acid solution to dissolve any undissolved vanadium remaining therein.

According to a process disclosed in U.S. Pat. No. 4,130,627, coal ash is heated up to 90° C. to 135° C. whereupon it is treated with alkaline reactants. An alkaline aqueous mixture and a solid residue are separated by filtration.

Iron and aluminium are dissolved from the solid residue with hydrochloric acid or hydrofluoric acid as the corresponding chloro and fluoro compounds. Alumina is obtained by electrolysis and silicon remains at the bottom of the electrolyzer. The main object of this process is the recovery of the main components of ash, i.e. the production of alumina and high-grade silica powder. Though the possibility of isolating other metals is also alluded to, there are no specific hints how to proceed when the recovery of further components is not desired. A characteristic feature of the process is that the combustion residue is completely (or almost completely) digested and accordingly, all components of the combustion residue are dissolved. The separation of the valuable rare metals from accompanying substances requires further, rather complicated technological steps, which are not disclosed in the cited patent and have an extremely high energy demand.

Although the more valuable components can be recovered more selectively by chlorination of the ash and fly ash, due to the high reactivity of the reactants used, the necessary apparatus is very expensive. Moreover, by these processes only certain rare metals can be isolated, they are not suitable for a complex recovery of rare metals.

SUMMARY OF INVENTION

The invention relates to a new process for recovering rare metals from the combustion residues of coals, by which the drawbacks of the processes known in the art can be eliminated. According to this process the rare metals or desired representatives thereof can be isolated effectively, economically, in simple and cheaper apparatus, by simple technological steps. The installation and operation costs are also considerably low. A further advantage of the instant process consists in the fact that the combustion residue from which rare metals are dissolved can be used conventionally for conventional purposes.

According to the invention the combustions residue of coals, in particular brown coals containing rare metals, if desired, is reduced to a grain size of lower than 1 mm., preferably 0.1 mm. and/or is sized. Its rare metal content is digested in water and/or in dilute aqueous alkaline or acid solution of a temperature less than the boiling point of water, while if desired, the solid phase is neutralized. During solution the concentration of the solution is monitored and the process is terminated at a desired concentration. Thereafter the liquid and solid phases are separated, rare metals are recovered from the liquid phase and the solid phase is utilized if desired, after neutralization and/or washing.

BRIEF DESCRIPTION OF THE DRAWING

The FIGURE shows schematically a flow diagram of the process of this invention.

DETAILED DESCRIPTION

According to a preferred embodiment of the process aqueous and/or alkaline digestion are accomplished with liquids having a temperature about the boiling temperature of water, while acid digestion is performed with a chemical at about room temperature.

According to a further preferred embodiment digestion is carried out in distinct or subsequent steps, which are connected with each other in a given order. Digestion may be carried out in parallel, counter or mixed flow, discontinuously or continuously.

According to a still further preferred embodiment of the process, when digestion is performed in more steps, to the solution concentrate, a fresh digesting solution is added in an amount corresponding to the liquid content of the solid phase after separation, and the concentrate is recycled to digestion.

Alkaline digestion is preferably carried out with a 1.5 to 8.0% by weight, preferably 2 to 3% by weight, aqueous solution of sodium carbonate or potassium carbonate, which has a pH of 10 to 14. The dilute acidic digestion is accomplished with mineral acids, preferably with a 0.5 to 5%, more preferably 2 to 3% by weight, aqueous solution of hydrochloric acid or sulfuric acid, having a pH of 0 to 1.

It is preferred to terminate the aqueous digestion as soon as the concentration of vanadium shows a constant value. The digestion with a dilute aqueous alkaline solution is preferably ceased when the vanadium concentration becomes constant and the concentration of aluminium is suddenly increased. The digestion with a dilute aqueous acid solution is preferably continued at most until a sudden increase in the iron concentration is observed.

The invention is based on the realization that the overwhelming majority of the rare metal content of coal is bound to its organic material. Therefore, after burning, i.e. oxidation of the organic materials, the rare metals will be dominantly found on the surface of slag, ash and fly ash originated from the dead rock, where they are bound by adsorption strengths. An overwhelming majority of the total rare metal content of various coals is bound in this way. Therefore, if burning is performed at a higher temperature using longer residential times, the majority of rare metals present can be recovered according to the process of this invention.

Experiments show that about 80% of the rare metal content is bound in adsorptively even if the ash content of the coals tested varies between 7.5 and 34% and burning is carried out under extreme conditions, i.e. at a temperature of 1200° C., with a resident time of about 7 hours. About 20% of the total rare metal content is built into the silicate lattice. The proportion is even more favourable when a lower temperature is used or the resident time is shorter. If, for instance, burning is carried out at 800° C. and the resident time is 10 hours, practically the total rare metal content is bound by adsorption bonds, while at a temperature of 1000° C. the quantity of the rare metals built into the silicate lattice exceeds 5% only if a residential time over 6 hours is employed.

From the above results the conclusion can be drawn that there is no need for digesting the total ash to recover the rare metals, i.e. the solution of the main components can be avoided making the process non-destructive.

This results in the further advantage that the solid combustion residue remains practically unchanged after recovering the rare metals and thus can directly be used for conventional purposes in a conventional way.

The type of the rare metal compounds bound by adsorption strengths depends on the chemical composition of coal ash, on the type of the rare metals and on the thermal load (temperature and resident time). If the coal contains a sufficient amount of sulfur and the thermal load is not extremely high, a substantial amount of rare metals will be converted into the corresponding sulfates. By increasing the thermal load and decreasing the sulfur concentration the oxides will become dominant. Depending on the specific rare metals, on the alkali metal and alkali earth metal content of the ash, and the like the oxides may be simple or mixed oxides.

Although the solubility of the various rare metal compounds is different, the total amount of such rare metals bound by adsorption may be recovered by subsequent treatment with different solvents according to the invention process.

As a result of the aqueous digestion step, those elements of the Vb and VIb columns of the periodic system which form simple oxo anions (V, Nb, Ta, Cr, Mo, W) and provide water-soluble salts with the alkali and alkali earth metals present, will be dissolved. In addition, the water-soluble sulfates of rare metals go into solution.

As a second step a digestion with a dilute alkali carbonate (for example a 1% aqueous sodium carbonate solution) is employed. In this step the water-insoluble polymeric or heteropolymeric oxo anions are depolymerized and dissolved as alkali metal salts.

The solutions obtained as a result of aqueous and alkali carbonate digestions contain little contaminating materials besides leaching reactant and rare metals to be recovered since these digesting processes do not dissolve the main components. Accordingly, processing of the solutions is a simple operation.

In a third step the lantanides and actinides bound by adsorption are dissolved. These metals (except uranium) do not form anions and therefore can be dissolved only by a dilute aqueous acid solution. In this step, if desired after neutralization, the solid combustion residues subjected to one or both of the previous treatments can also be dissolved, but this step—just like the other ones—can be performed also separately, even as a first treatment.

Since rather dilute acid solutions are employed (about 0.5 to 5.0%), during the digestion (generally 0.5 to 1.0 hours depending on the efficiency of the contact of phases) the main components are not attacked. Accordingly, the solution obtained contains in addition to the rare metals to be separated only the acid used for the acid treatment, the iron bound to the surface of combustion residue and a part of the mobilizable alkali metal and alkali earth metal concentration. For example if a brown coal originally containing 4000 ppm of lanthanides and actinides is heated at 1200° C. for 5 hours and is then subjected to the above treatment, about 70% of its total lanthanide and actinide content is dissolved.

All digestion steps can be carried out in one or more stages and, except the acid digestion step, hot digestion agents may also be employed. In the acid treatment the use of hot reactants should be avoided, in particular when a dilute aqueous sulfuric acid solution is employed, since the solubility of rare earth metals is generally decreased by increasing temperature.

Since the invention is based on the fact that the majority of rare metals is bound on the surface of combustion residues by adsorption and can therefore easily be dissolved, and on the other hand, the dissolution of the main components of the combustion residue should be avoided, the process according to the invention must strictly be controlled. The conditions of dissolution are very much dependent on the actual technology employed, therefore the optimum time of digestion should be determined for every specific case in the following manner:

(a) During aqueous digestion the concentration of vanadium should be monitored. At the beginning the concentration shows an abrupt increase, whereupon the rise of the concentration curve decreases and finally the concentration becomes constant. The time necessary to obtain a constant vanadium concentration is the optimum duration of the aqueous digestion.

(b) During the digestion with a dilute alkali carbonate solution the concentration of vanadium and aluminium should simultaneously be monitored. At the beginning the aluminium concentration is practically zero but as soon as the vanadium concentration becomes constant, the dissolution of aluminium is suddenly accelerated. The optimum duration of alkaline digestion corresponds to the inflection point of the curve.

(c) During the acid treatment only the iron concentration of the solution should be monitored. At first the iron concentration shows a slow increase whereupon the dissolution is suddenly accelerated. The optimum duration of acid digestion corresponds to the inflection point of the curve.

The rare metal concentrates obtained by the process of this invention may be subjected to further processing separately or after being combined. The concentrates may be further enriched in rare metals by evaporation, adsorption or absorption and the various metals may be separated, for example, by ion exchange chromatography. The concentrates may also directly be subjected to further hydrometallurgical treatments.

The ash, slag, fly ash residue and the like can be utilized conventionally, after neutralization and washing.

The process is illustrated in the FIGURE where the following designation is used. The first digits of the two-digit numbers correspond to the serial number of the digestion step. The second digits have the following meanings:

1 = solid substance (combustion residue) input
2 = digestion agent (solution concentrate) input
3 = digestion
4 = phase separation
5 = digestion agent supplement
6 = heating
7 = input of a concentrated solution to a next stage
8 = solution concentrate output
9 = solid phase output In the first stage of the aqueous digestion step, the combustion residue 11 and the digestion agent 12 are introduced into a digester 13. If desired, the combustion residue 11 may previously be reduced in grain size and/or sized, but these steps and the apparatus therefore are not shown in the FIGURE. During digestion in the digester 13 the concentration of the solution is monitored (the control is not shown in the FIGURE). In a next step the digestion medium is conveyed to a separator 14 where its phases are separated. The liquid content of the separated solid phase is measured and a corresponding quantity of fresh digestion agent is introduced through an inlet line 15 to the phase separator 14 and added to the liquid phase in the separator 14. If a certain step is performed in subsequent stages, the liquid phase is fed to the heater 16 and heated therein then led to the next stage through line 17 to the digester 13. As soon as the desired concentration is achieved, the concentrate from the separator 14 is conducted through line 18 and discharged, it can be subject to further manufacturing steps. The separated solid phase 21 is led by line 19 from the phase separator 14 to the second stage digester 23 where it is introduced into the system. Lines leading to the same stages within the separate steps are designated by dotted lines in the FIGURE.)

After introducing the solid substance 21 to the second stage digester 23 containing previously introduced digestion agent 22 and the concentrated solution from the heater 26 introduced to the digester 23 through the line 27 and essentially the same procedure is followed as from stage 1 to stage 2 when going from stage 2 to stage 3. The same steps and apparatus are numbered with the same second digit as in the previous stage, with the first digit being "1" for the first stage, "2" for the second stage and "3" for the third stage as shown in the FIGURE.

In the third digestion step (acid), the concentrate from the separator 34 is recycled in the same stage but is not reheated. After the phase separation in the separator 34, the solid phase is discharged from the system through line 39 and, if desired, after neutralization and/or washing (not shown in the FIGURE) is utilized.

The invention is further illustrated by the following example, which is not intended to limit the scope of the invention in any way.

EXAMPLE

Basic material: coal derived from Tatabánya-Csordakut, Hungary, containing 7.8% of humidity, 7.5% of ash, and 7.57% of sulfur. The ash obtained by burning this coal had the following composition:

$SiO_2 = 18.27\%$, $TiO_2 = 2.08\%$, $Al_2O_3 = 34.16\%$, $Fe_2O_3 = 29.54\%$, $CaO = 11.64\%$, $MgO = 1.77\%$, $K_2O = 0.24\%$, $Na_2O = 1.38\%$, $H_2O = 0.55\%$, $P_2O_5 = 0.25\%$.

The concentration of rare metals related to the ash was as follows:
vanadium: 3322 ppm,
Mo: 232 ppm,
total rare earth metal content: 2077 ppm,
actinides: 2500 ppm.

According to derivatographic measurements the minimum temperature required to obtain a total burning of organic matter was 795° C. In view of this fact coal was burnt at a temperature of 800° C., 1000° C. and 1200° C., respectively and the ashes obtained were kept at the given temperatures for different times. Thereafter the grain size of the ash was reduced to 0.5 mm. and the ash was sized and digested in three steps by the process according to this invention.

The following results were obtained:

1. Aqueous digestion at 60° C., using 150 ml. of water pro 1 g. of ash.

| temperature (°C.) | less than 1 hour | duration of heat treatment (hours) | | | | | | |
|---|---|---|---|---|---|---|---|---|
| | | 1 | 2 | 3 | 4 | 5 | 6 | 7 | 8 |
| 800 | + | + | 18.2 | + | 17.5 | + | + | 17.3 | + |
| 1000 | + | + | 17.7 | + | 15.3 | + | 14.2 | + | 12.6 |
| 1200 | 25.2 | 14.6 | 10.6 | + | + | + | + | + | + |

+ no analytical data available

The numerical values given in the above table show the amount of dissolved vanadium in % of the total vanadium content.

2. Digestion with a dilute aqueous alkaline solution carried out at 60° C. using 150 ml. of a 1.5% aqueous sodium carbonate solution pro 1 g. of ash.

| temperature (°C.) | less than 1 hour | duration of heat treatment (hours) | | | | | | |
| --- | --- | --- | --- | --- | --- | --- | --- | --- |
| | | 1 | 2 | 3 | 4 | 5 | 6 | 7 | 8 |
| 800 | + | + | 99.6 | + | 99.5 | + | + | 98.3 | + |
| 1000 | + | + | 90.0 | + | 95.2 | + | + | + | 93.3 |
| 1200 | 49.3 | 75.9 | + | 79.0 | + | + | + | 80.4 | + |

+ has the same meaning as defined above.

The numerical values given in the above table show the amount of dissolved vanadium in the subsequent aqueous and alkaline digestions in % of the total vanadium content.

3. Digestion with a dilute aqueous acid solution at 20° C., using 150 ml. of a 1.5% aqueous hydrochloric acid solution pro 1 g. of ash.

| temperature (°C.) | less than 1 hour | duration of heat treatment (hours) | | | | | | |
| --- | --- | --- | --- | --- | --- | --- | --- | --- |
| | | 1 | 2 | 3 | 4 | 5 | 6 | 7 | 8 |
| 800 | + | + | 92.0 | + | 89.0 | + | + | 88.3 | + |
| 1000 | + | + | 87.0 | + | 85.0 | + | + | + | 84.7 |
| 1200 | 72.0 | 70.0 | + | 68 | + | + | + | 65.0 | + |

+ has the same meaning as defined above.

The numerical values given in the above table show the amount of dissolved rare earth metals in % of the total rare earth metal content.

From the above data it can be clearly seen that the relatively mild digestion agents used according to the invention dissolve an unexpectedly high proportion of the rare metals present in the combustion residue of coal. It can also be concluded that by increasing the heat load (temperature and residential time) the availability of the rare metals is decreased. Although in this example a relatively long (4 hour) digestion time was used, the loss in weight of the ash after the aqueous and dilute alkaline digestions was less than 1% and even in the acid digestion was as low as 3%. This clearly shows that the valuable components are on the surface of the ash and can be dissolved without attacking the other, main components of the ash.

What we claim is:

1. A non-destructive digestion process for recovering metals of Groups V/b and VI/b of the Periodic Table and the lanthanides and actinides adsorbed on the surface of the combustion residues of coal comprising the separate steps of
    (a) reducing the grain size of said combustion residue to from about 0.1 to about 1 mm;
    (b) digesting the combustion residue with water;
    (c) digesting the combustion residue with a dilute aqueous alkaline solution;
    (d) digesting the combustion residue with a dilute aqueous acid solution at a temperature below the boiling point of water and continuing said acid digestion until the iron concentration abruptly increased;
    (e) separating the solid and liquid phases after each digestion; and
    (f) isolating the said metals from the liquid phase; with the proviso that steps (b), (c) and (d) can be in any order and the total digestion time is up to about 4 hours.

2. A process as claimed in claim 1, in which the alkaline digestion is carried out with a 1.5 to 8.0% by weight, aqueous alkali carbonate having a pH of 10 to 14.

3. A process as claimed in claim 1, in which the acid digestion is carried out with a 0.5 to 5% by weight aqueous solution of a mineral acid having a pH of 0 to 1.

4. A process according to claim 1 wherein the residues treated are from brown coal.

5. A process according to claim 2 wherein the concentration of said aqueous alkali carbonate is about 2 to 3% by weight.

6. A process according to claim 2 wherein the aqueous alkali carbonate is selected from the group consisting of sodium carbonate and potassium carbonate.

7. A process according to claim 3 wherein the concentration of said aqueous mineral acid is about 2 to 3% by weight.

8. A process according to claim 3 wherein said mineral acid is selected from the group consisting of hydrochloric acid and sulfuric acid.

* * * * *